United States Patent [19]

Heaton et al.

[11] 4,018,112

[45] Apr. 19, 1977

[54] MACHINE TOOL HAVING A SPECIAL INDEXABLE TURRET AND METHOD OF OPERATION

[75] Inventors: James W. Heaton, Greensburg; Donald W. Warren, Latrobe; Albert B. Albrecht, Ligonier, all of Pa.

[73] Assignee: Kennametal Inc., Latrobe, Pa.

[22] Filed: Nov. 29, 1974

[21] Appl. No.: 528,159

[52] U.S. Cl. .................. 82/1 C; 82/36 A; 74/818; 408/35
[51] Int. Cl.² .................................. B23B 1/00
[58] Field of Search ............ 82/36 A, 2 R; 74/818, 74/816; 29/568; 408/3, 8, 35

[56] References Cited
UNITED STATES PATENTS

| | | | |
|---|---|---|---|
| 1,822,514 | 9/1931 | Bullard | 82/36 A |
| 3,010,348 | 11/1961 | Swanson et al. | 82/36 A |
| 3,222,955 | 12/1965 | Ross et al. | 74/816 X |
| 3,685,022 | 8/1972 | Raynes | 408/3 |
| 3,817,647 | 6/1974 | Lemelson | 408/8 |

*Primary Examiner*—Leonidas Vlachos
*Attorney, Agent, or Firm*—Melvin A. Crosby

[57] ABSTRACT

A machine tool having an indexable turret in which the turret has a plurality of stations for supporting tools and with the tools in the stations being presented individually to workpiece operating position in a respective indexed position of the turret during a work cycle. At least two of the stations of the turret are provided with identical tools, forming a group, and on each work cycle one of the pair of stations is bypassed thereby providing a reserve tool which can be made effective without interrupting the work cycle of the machine. Advantageously, most of the tools carried by the turret are provided in groups so that substantially a complete set of reserve tools is provided. Each tool can be used for a certain number of work cycles, or the machine can be provided with adaptive, or tool sensing, controls which sense the dulling or breaking of a tool, or workpieces taken from the machine can be periodically guaged to determine when a particular tool has worn down to the allowable limit. The back up or reserve tools can then be called into play, either individually, or as a set. The invention is adapted for use with automatic machines with an automatic arrangement provided for changing from one tool of a group thereof to an identical tool of the same group. In this manner, a machine tool having a turret tooled up according to the present invention can be maintained in operation for a substantially longer period of time than has heretofore been possible thereby increasing production from the machine tool.

6 Claims, 13 Drawing Figures

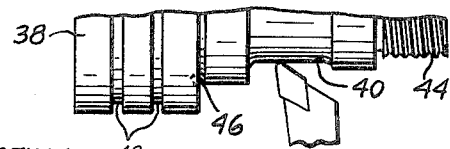
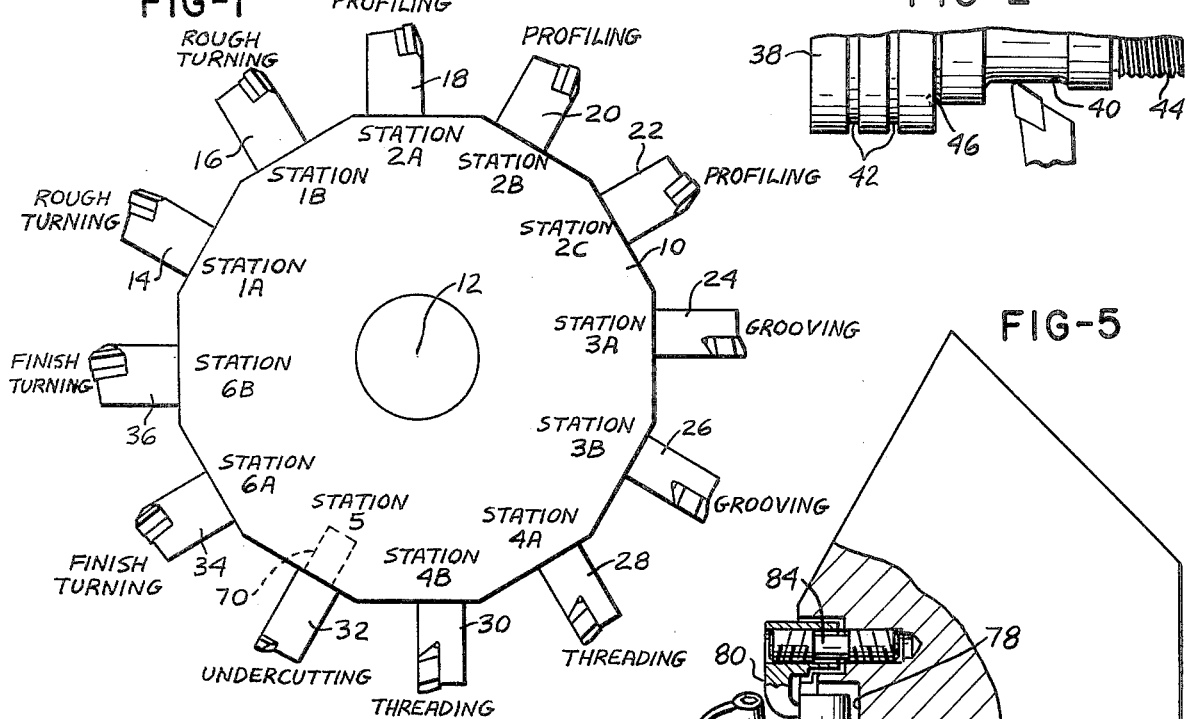
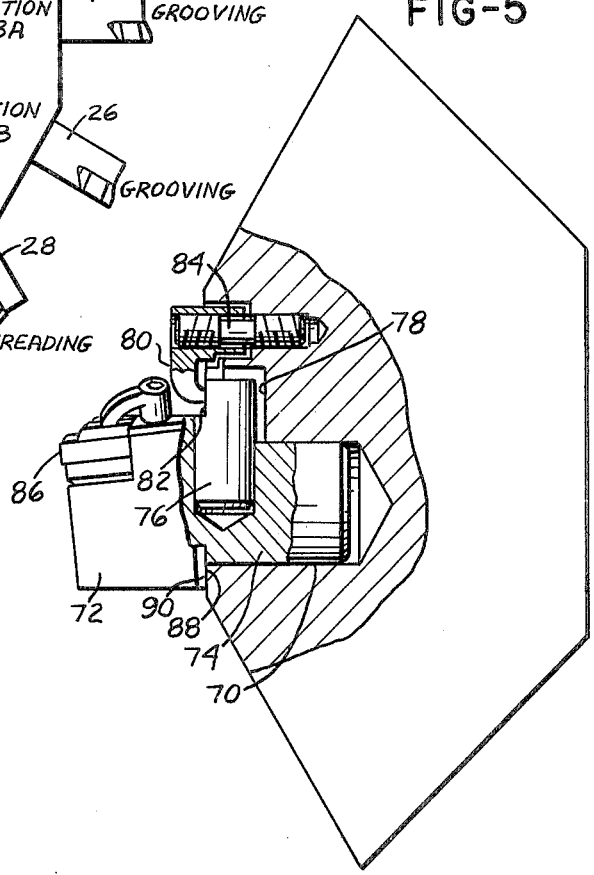
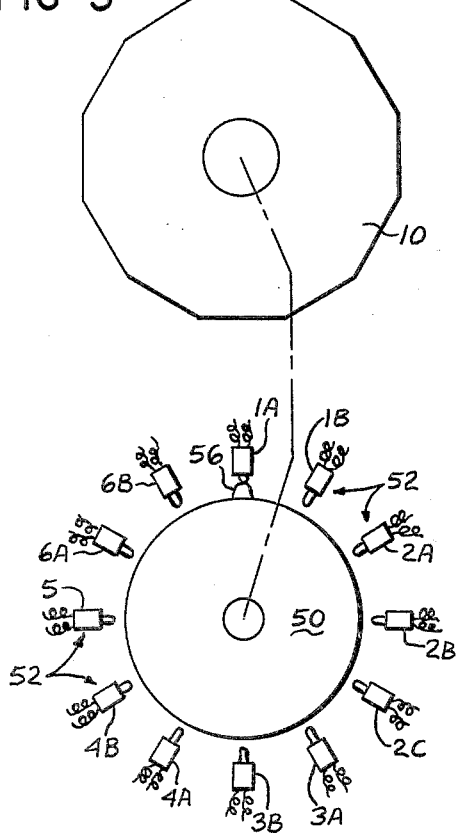
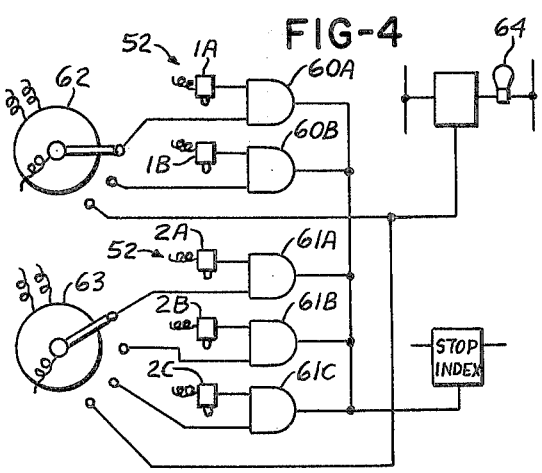

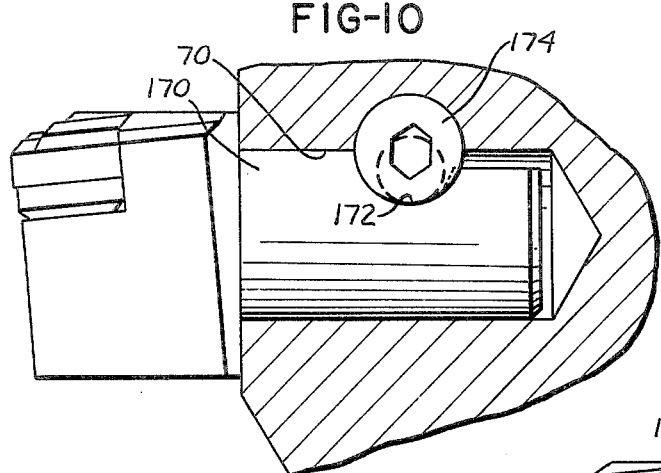
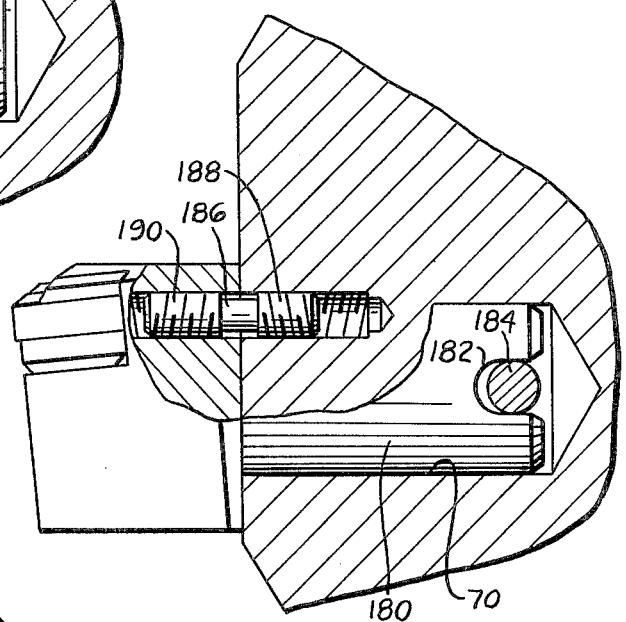
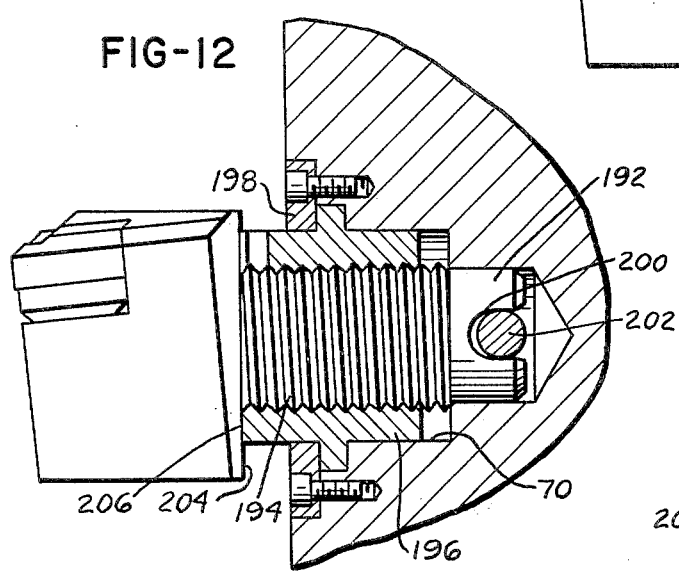
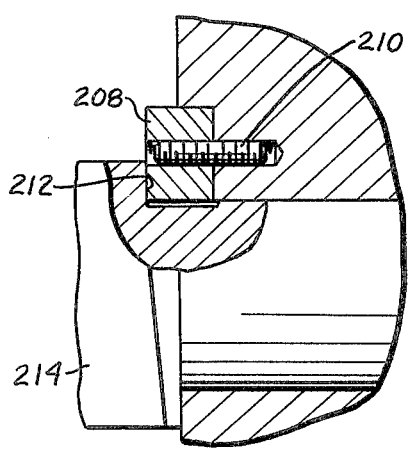

MACHINE TOOL HAVING A SPECIAL INDEXABLE TURRET AND METHOD OF OPERATION

The present invention relates to a machine tool having at least one indexable turret and to a method of operation thereof.

Machine tools having turrets are well known and include turret lathes and like turning machines. A machine tool turret is generally in the form of a body having the shape of a regular polygon with a tool mounted in each of at least some, preferably, all, of the faces of the turret body.

During operation, the turret is indexed from position to position thereby presenting the tools carried thereby individually to workpiece operating position. The provision of a turret on a machine tool permits the carrying out of relatively complicated machine operations for one chucking of a workpiece thereby saving substantial time.

Heretofore, it has been the case that turrets were provided with individual tools for carrying out individual work operations on a workpiece. For example, a workpiece might first be rough turned, and then a profiling operation might be carried out thereon, and then grooving and threading operations and, in some cases, other operations such as undercutting and quite often a final finish turning of at least part of the workpiece surface.

When the individual tools for carrying out the aforementioned operations are mounted in a turret, the entire work cycle must be shut down upon the dulling or breaking of any one of the tools and upon any of the tools wearing to beyond the allowable size limits thereof. When the cycle is thus interrupted, production time is lost from the machine tool, and this, of course, represents a substantial expense.

Advantageously, when a plurality of different work operations are to be carried out, most of the individual tools are duplicated in the turret and, in some cases, three of a particular tool might be carried by a turret. By utilizing the individual tools for the maximum possible or maximum desirable length of time before commencing to use another tool identical thereto, the machine tool can be maintained in operation for longer periods of time than has heretofore been possible.

With the foregoing in mind, a primary objective of the present invention is the provision of a turret arrangement for a machine tool in which at least some of the cutting tools carried by the respective turret stations are duplicated in other turret stations to form a tool group so that a selected one of a group of identical tools or a complete set of new tools can be employed until it becomes time to renew the tool whereupon the work cycle continues with another of the identical tools being employed in place of the first mentioned tool.

Another object of the present invention is the provision of a method of operating a turret type machine tool so as to minimize the down-time of the machine tool.

BRIEF SUMMARY OF THE INVENTION

According to the present invention, a multisided turret is provided with means being provided in each side for fixedly mounting a cutting tool therein. The cutting tools are arranged in groups with most of the groups consisting of two identical tools although it is possible for a group to consist of three identical tools or of only a single tool.

During a work cycle, the turret normally indexes step by step through 360° and presents the tools carried thereby individually to the work in succession. In the case of the present invention, the turret indexes from group to group of the cutting tools carried thereby so that during one complete work cycle a single tool of each group is presented to the workpiece being operated.

By means of operator observation or by counting the number of cycles, or by the use of adaptive or tool sensing controls on the machine tool, a second tool of a respective group, or an entire tool group, can be caused to move into operative position instead of a previousy used tool of the same group so that machining is always done with cutting tools which are in good condition thereby insuring that workpieces will be accurately sized and will be produced as rapidly as possible and without the machine tool having to be shut down to replace tools in the event of failure of any thereof.

Tool holder changing will then be done quickly so as to have a minimum effect on productivity and, in fact, could be accomplished on an "off shift." Insert changing will be done at a work bench or at a station internal to the machine cycle so as to have absolutely no effect on machine productivity. It is also possible to "line balance" tools in relation to respective wear rate and thereby optimize overall performance.

This invention, thus, deals with the non-cutting portion of the machine cycle by minimizing downtime for tool changes and, in addition, speeds up those changes as they are required through the use of quick change devices. The system also uses current, i.e., known cutting inserts and reasonable and known tooling practices.

In addition, the turret of the present invention provides additional tool positions for more complex workpieces coupled with the aforementioned quick change feature.

The exact nature of the present invention will become more clearly apparent upon reference to the following detailed specification taken in connection with the accompanying drawings in which:

FIG. 1 is an elevational view looking in at a typical turret in the direction of the axis thereof and showing the grouping of the tools thereon with the tools identified in respect of the operations carried out thereby.

FIG. 2 is a view showing a workpiece that might be turned with the tool arrangement illustrated in FIG. 1.

FIG. 3 is a schematic view showing a simple arrangement for determining the indexed positions of the turret.

FIG. 4 is a schematic control circuit for controlling the indexing of the turret.

FIGS. 5 through 13 show various manners in which tools can be fixed in the respective work stations of the turret.

DETAILED DESCRIPTION OF THE INVENTION

Figure 6:
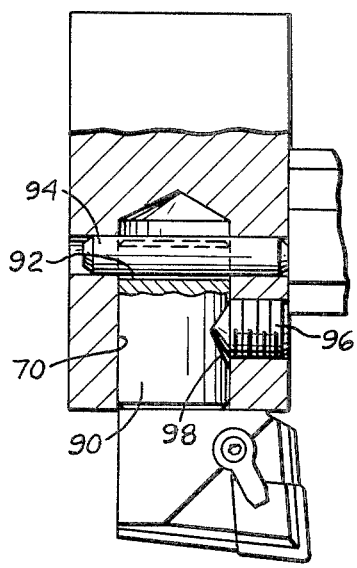

Referring to the drawings somewhat more in detail, in FIG. 1, a turret 10 is illustrated which is indexable on an axis 12 and which turret is provided with a plurality of stations for receiving cutting tools. In FIG. 1, the respective stations are identified and the respective tools mounted therein are somewhat schematically illustrated and are identified in respect of the particular work operations to be carried out thereby.

Reference to FIG. 1 will show that the turret carries a pair of identical tools 14 and 16 in stations 1A and 1B for the purpose of rough turning and then has identical tools indicated at 18, 20 and 22 in stations 2A, 2B and 2C which are provided for the purpose of profiling. A pair of grooving tools 24 and 26 are provided in stations 3A and 3B and a pair of threading tools 28 and 30 are provided in stations 4A and 4B.

A single undercutting tool 32 is provided in station 5 and, finally, a pair of finish turning tools 34 and 36 are provided in stations 6A and 6B. The tools carried by turret 10 in FIG. 1 project therefrom radially, but it will be understood that the turret could carry tools projecting therefrom in the axial direction in one or more stations of the turret if so desired.

The particular tool arrangement shown in FIG. 1 might be employed, for example, for turning the workpiece 38 illustrated in FIG. 2. The workpiece would first be rough turned by one or the other of rough turning tools 14 and 16, and then at least the intermediate section thereof, indicated at 40, would be profiled by one or the other profiling tools 20 and 22. The grooves 42 would then be formed by one or the other of grooving tools 24 and 26.

The threading at 44 on the workpiece would be formed by one or the other of the threading tools 28 and 30. An undercut at 46 on the workpiece is formed by the undercut tool at 32 and there is only one tool in this group because the operation carried out by the tool is a fairly light operation and the undercutting tool would, normally, therefore, have an extended life.

Finally, the workpiece is finish turned where necessary by one or the other of the finish turning tools at 34 and 36.

The workpiece shown in FIG. 2 might, for example, be a piston with the grooves 42 being provided to receive piston rings and with the undercut 46 being provided to eliminate a high stress region. The workpiece of FIG. 2 is only exemplary and other workpieces, requiring different tool set ups, may be operated.

When the machine is set into operation, the first tool of each group might be employed for the work operation with the other tool or tools of each group being bypassed as the turret indexes. After a certain number of workpieces have been operated, a tool in any one or more groups may be retired and to accomplish this the turret is merely caused to bypass that particular tool and to index instead to another tool of the same group.

The particular manner in which the turret is driven during indexing and the particular manner in which it is halted in each indexed position is not illustrated because such devices are well known in the trade and are employed in connection with substantially all turret type machines.

What is different in respect of the turret arrangement of the present invention is the provision of a means for causing the turret to bypass a respective station during a work cycle in order to bypass the tools of a respective group which are not then being employed for work operations.

FIGS. 3 and 4 schematically illustrate one way of accomplishing the selective indexing of the turret. In these figures, a rotary member 50 is illustrated having the same number of stations distributed therearound as there are work stations in turret 10. Member 50 is connected to rotate in unison with turret 10 by any suitable sort of positive connection between the turret 10 and member 50 such as gearing or the like. Adjacent member 50 are control limit switches 52 each of which is operative when actuated to interrupt the indexing of the turret so that it comes to a halt in a predetermined indexed position.

A cam 56 on member 50 is provided for actuating limit switches 52. The cam 56 engages each limit switch in turn and, when a limit switch is effective, the turret will halt in a corresponding position.

Limit switches 52, and which are identified by the same reference numerals as the turret stations to which they pertain, are connected in circuit as shown in FIG. 4 so that they can be made selectively effective.

For example, the limit switches 52 marked 1A and 1B are singly effective and this is accomplished by connecting each limit switch to one terminal of a respective AND gate 60A, 60B. The other input terminals of the AND gates are connected to terminals of an indexing switch 62 having a contact moveable between the contact connected to the other input terminal of gate 60A and a terminal connected to the other input terminal of gate 60B and a further terminal connected for illuminating a signal lamp 64.

When the machine is first put in operation, the blade of switch 62 is in the position illustrated and in this position the limit switch 52 marked 1A will be effective for stopping the turret in the corresponding position so that the first roughing tool, indicated at 14 in FIG. 1, is in effective position.

Upon supplying a signal to the indexing switch at 62, and which signal may be a manual signal, or a signal from an adaptive control, or from a counter, switch 62 will index so that the blade engages the terminal extending to the other input terminal of gate 60B whereupon the next time the turret is indexed completely around cam 56 will bypass limit switch 52 marked 1A and will pass on to the limit switch 52 marked 1B and the turret will stop in the corresponding position and the second rough turning tool 16 will then be effective.

It is possible for switch 62 to be indexed to a third position in response to a signal and whereupon signal lamp 64 will become illuminated indicating that the machine is to be shut down. The third indexed position of switch 62 could also result in automatic shut down of the machine.

The next group of stations in which profiling tools 18, 20 and 22 of FIG. 1 are grouped, and the limit switches 52 marked 2A, 2B and 2C pertaining thereto, have associated therewith the AND gates 61A, 61B and 61C. In this case, the other terminals of the AND gates are connected to respective terminals of a second indexing switch 63 which indexes the blade from terminal to terminal thereby making the gates 61A, 61B and 61C sequentially and selectively effective.

Each of the groups of stations about the turret have similar circuitry associated therewith and not shown herein.

When a newly tooled turret is put in position or, when the tools in the turret are all replaced, all the indexing switches are moved back to the starting position and a machining operation can then be commenced.

The turret 10 of the machine tool is provided with holes 70 distributed about the periphery thereof and in which holes the respective tools are mounted in predetermined oriented positions. A plurality of different arrangements can be utilized for mounting the tools in the turret and certain ones thereof are illustrated in FIGS. 5 through 12.

In FIG. 5, for example, the tool indicated at 72 is a shank 74 receivable in the hole 70 in the turret. The shank 70 is provided with a pin 76 of substantial size which projects laterally therefrom and which is receivable with substantially no clearance in a notch 78 provided in the turret. A clamp member 80 engages a flat 82 provided on the outwardly facing side of pin 76 and is moveably held in the turret by screw 84 which may have a righthand thread on the portion in the turret and a lefthand thread on the portion in clamp 80.

The tool 72 is, in the aforesaid manner, fixedly held in the turret while being accurately oriented thereto about the axis of the shank. The outer end of the tool which carries the cutting insert 86 is larger than bore 70 and at the rearward end has a flat surface 88 engaging a flat face 90 on the turret. These faces locate the tool in the axial direction.

In FIG. 6, the tool shank 90 disposed in the respective bore 70 has a diametral slot 92 in the inward end which embraces a pin 94 fixed in the turret and extending diametrally across bore 70. A set screw 96 of substantial size has a cone point thereon engageable with conical recess 98 in the shank to fix the shank of the tool in the turret while drawing the tool shank into the turret so that the head of the tool abuts the flat side of the turret the same as in the case of the FIG. 5 modification.

Figure 7:
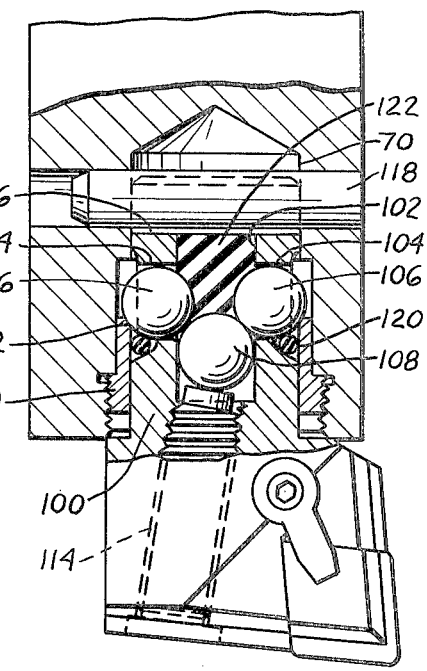

FIG. 7 shows an arrangement wherein the shank 100 of the tool is provided with a central axial bore 102 while radial bores 104, which may be three in number, intersect the axial bore. Ball elements 106 are mounted in the radial bores and a further ball element 108 is mounted in the axial bore. The bore 70 in the turret is counterbored and threaded at the outer end and mounted therein for a steel ring 110 which, at the inner end, has a bevelled end surface 112 for engagement by balls 106.

A screw 114 at the inner end engages ball 108 and is accessible from the inner end of the tool. When the shank of the tool is placed in bore 70, a lateral slot 116 at the inner end embraces the fixed pin 118 in the bore thereby angularly to locate the tool and upon rotation of screw 114 ball 108 will move inwardly and cause balls 106 to move outwardly and engage the inner end of sleeve 110 and thereby draw the tool backwardly toward the turret into a fixed axial location therein.

A rubber-like O-ring 120 can be provided to retain balls 106 in the respective bores therefor and the rearward end of axial bore 102 may be provided with a rubber-like filler plug 122.

Figure 8:
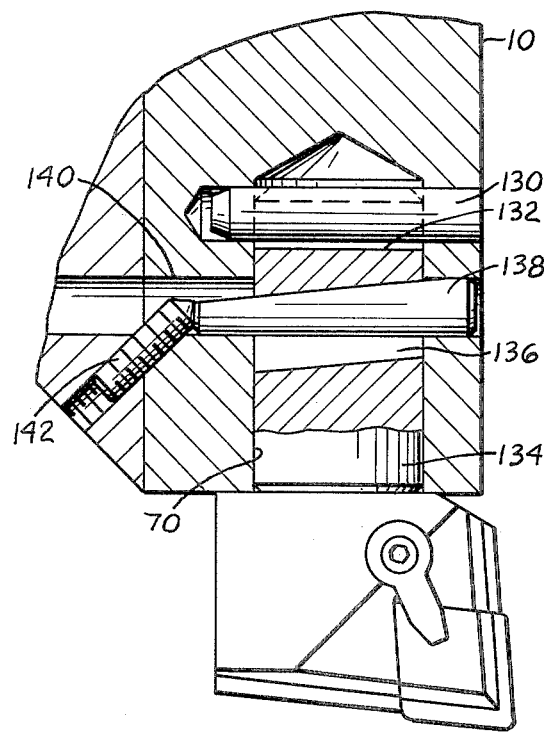

In FIG. 8, bore 70 in turret 10 is provided with a pin 130 engageable with a notch 132 in the inward end of shank 134 of the tool while the same is provided with an inclined cross bore 136 adapted for receiving a tapered pin 138 in a bore 140 in the turret. When pin 138 is driven into position, the tool shank will be pulled inwardly into the turret until the head of the tool engages the flat outer face of the turret. The pin 138 can be dislodged by availing of set screw 142, or it can be driven out by the use of a pin introduced into the end of the bore 140 at the smaller end of pin 138.

Figure 9:
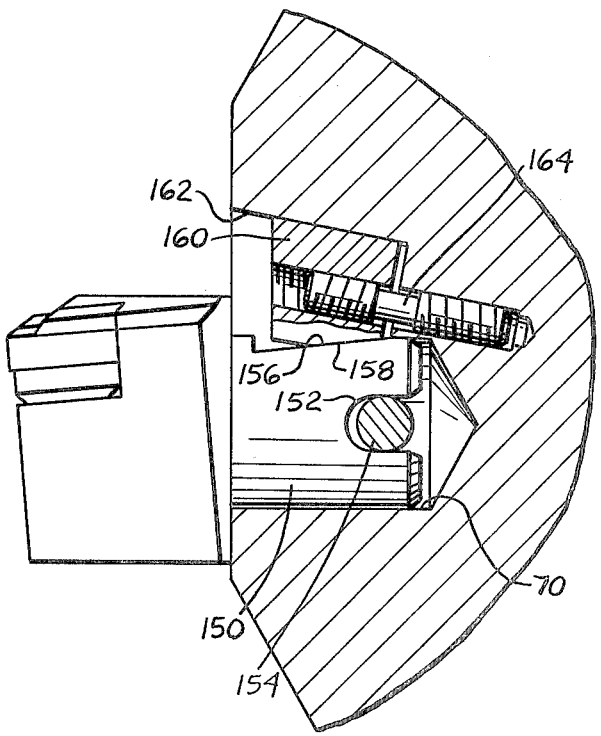

In FIG. 9, the shank 150 of the tool has a slot 152 at the inner end to engage pin 154 in the turret while one side of the shank presents an incline 156 engageable by the inclined surface 158 on a wedge member 160 which is accommodated in the lateral offset portion 162 of the bore 70 in the turret. A double threaded screw 164 similar to that described in connection with FIG. 6 is provided for moving wedge member 160 inwardly and outwardly on the turret for clamping and unclamping the respective tool.

FIG. 10 shows an arrangement wherein the shank 170 in bore 70 is provided with an arcuate undercut 172 engageable by eccentric pin 174 mounted in the turret. The pin 174 when engaging the arcuate notch 172 effects orientation of the tool about the axis thereof while simultaneously drawing the shank of the tool inwardly until the head of the tool engages the pertaining side of the turret.

In FIG. 11, the shank 180 in bore 70 of the turret has a notch 182 at the inner end to engage pin 184 fixed in the turret while a double threaded screw 186 similar to that described in connection with FIG. 6 is provided in a region radially outside the range of shank 180. The screw may have an end portion 188 with a righthand thread threaded into the turret and another end portion 190 with a lefthand thread which threads into the head of the tool. By rotation of the screw, the tool shank can be pushed into bore 70 or removed from bore 70 with the head of the tool, as before, bottoming against the pertaining side of the turret for axially locating the tool in the turret.

FIG. 12 shows an arrangement wherein the shank 192 of the tool is provided with threads 194 engageable by a nut 196 which is rotatable in a counterbored portion of bore 70 of the turret while being retained in place in the turret by a keeper ring 198 carried by the turret. The inner end of the shank 192 is notched as at 200 to embrace pin 202 fixed in the turret thereby to locate the tool angularly about the longitudinal axis thereof.

The axial location of the tool in FIG. 12 can be effected by the pin 200 or by other abutment means provided between the shank and the turret or by having the flat rearward side 204 of the head of the tool abut the flat outer end 206 of nut 196.

In the case of the FIG. 12 modification, rotation of the nut 196 in one direction will draw the tool into the proper axial position while rotation thereof in the opposite direction will push the tool out of the turret.

In FIG. 13, a modification is shown in which a key 208 is mounted in the turret as by a screw 210 and engages a key recess 212 in the tool holder 214. The tool holder 214 may be connected to the turret by any of the devices shown in FIGS. 5 through 12 except that no keying device is required inside the turret body and, instead, all of the keying is done by key 208 which is favorably situated by easy replacement and for withstanding substantial torques that might be imposed on the tool holder.

All of the tool holders illustrated have cylindrical shanks, but it will be understood that the holder shanks could be tapered inwardly toward the rear and equivalent conditions of use and operation of the invention would obtain. The tapered shanks simplify the problems of quickly changing the tool holders but do not otherwise modify the invention disclosed herein.

The tool holders could be replaced during an idle period of the machine, or individual holder could be replaced in the turret while another tool in another holder in the turret was operating the workpiece. It is also possible to replace a turret periodically with one having fresh tools therein and to retool the removed turret at a retooling station separate from the machine.

Modifications may be made within the scope of the appended claims.

What is claimed is:

1. In a method of operating a machine tool which includes an indexable turret with a plurality of tool stations each having a cutting tool unit of a respective type therein and each tool unit being presentable in workpiece operating position in a respective indexed position of the turret, said method comprising; providing a group of at least two identical tool units, placing the identical tool units in adjacent ones of said turret stations, indexing the turret a predetermined number of times for a complete rotation thereof during a complete work cycle to present respective tool unit types carried thereby sequentially to workpiece operating position, and presenting a single one only of the tool units of said group thereof to workpiece operating position during a single work cycle.

2. The method according to claim 1 which includes connecting each tool unit to the turret with a quick change coupling device.

3. The method according to claim 1 which includes providing said turret with a plurality of groups of tool units with all of the tool units in a respective group being identical and with each group of tool units being of a respective type, placing the tool units of each group thereof in adjacent ones of said turret stations, and presenting a single one only of the tool units of each said group to workpiece operating position during a work cycle.

4. The method according to claim 1 which includes establishing predetermined conditions for the length of time said single tool unit is to be used for operating workpieces, and presenting another of the tool units of the same said group for operating further workpieces when said conditions are met.

5. The method according to claim 4 in which said conditions include at least one of (1) the size of a completed workpiece, (2) the number of workpieces operated by the respective tool unit, and (3) the load on the machine tool while the respective tool unit is operating a workpiece.

6. The method according to claim 1 which includes replacing respective tool units in the turret with like tool units placed in the same turret station while another tool unit in another station of the turret is operating on a workpiece.

* * * * *